(12) United States Patent
Baumbach et al.

(10) Patent No.: US 8,196,895 B2
(45) Date of Patent: Jun. 12, 2012

(54) ACTUATION DEVICE, VALVE MEANS AND OPERATING METHOD

(75) Inventors: Jens Baumbach, Ilmenau (DE); René Dingelstadt, Stuttgart (DE); Alfred Elsäβer, Keltern (DE); Patric Genieser, Stuttgart (DE); Georg Kaltwasser, Roda (DE); Martin Helmis, Stuttgart (DE)

(73) Assignee: Mahle International GmbH (DE)

( * ) Notice: Subject to any disclaimer, the term of this patent is extended or adjusted under 35 U.S.C. 154(b) by 237 days.

(21) Appl. No.: 12/622,481

(22) Filed: Nov. 20, 2009

(65) Prior Publication Data

US 2010/0133456 A1    Jun. 3, 2010

(30) Foreign Application Priority Data

Nov. 21, 2008 (DE) .......................... 10 2008 058 525
Nov. 28, 2008 (DE) .......................... 10 2008 059 449

(51) Int. Cl.
    *F16K 31/02*    (2006.01)
(52) U.S. Cl. .................................... 251/129.09; 310/32
(58) Field of Classification Search ............. 251/129.09, 251/129.11; 310/32
    See application file for complete search history.

(56) References Cited

U.S. PATENT DOCUMENTS

| | | | | |
|---|---|---|---|---|
| 3,470,509 A | * | 9/1969 | Silverman et al. | 335/229 |
| 3,970,979 A | * | 7/1976 | Montagu | 335/229 |
| 4,275,371 A | * | 6/1981 | Vogel | 335/272 |
| 4,447,793 A | * | 5/1984 | Gray | 333/106 |
| 4,899,073 A | * | 2/1990 | Takeuchi et al. | 310/116 |
| 6,674,349 B1 | * | 1/2004 | Bolongeat et al. | 335/229 |
| 7,623,012 B2 | * | 11/2009 | Baumbach et al. | 335/229 |

FOREIGN PATENT DOCUMENTS

| | | |
|---|---|---|
| DE | 10140706 A1 | 2/2003 |
| DE | 10225417 A1 | 2/2003 |
| DE | 10324398 A1 | 12/2004 |
| DE | 102004029339 A1 | 1/2006 |
| DE | 102006031205 A1 | 10/2007 |
| DE | 102007023039 A1 | 11/2007 |

OTHER PUBLICATIONS

English Abstract provided for DE10140706.
English Abstract provided for DE10324398.
English Abstract provided for DE102004029339.
English Abstract provided for DE10225417.
English Abstract provided for DE102006031205.

* cited by examiner

*Primary Examiner* — John Fristoe, Jr.
(74) *Attorney, Agent, or Firm* — Rader, Fishman & Grauer PLLC

(57) ABSTRACT

The present invention relates to an actuation device (5) for shifting an actuation member (4) between two end positions, in particular for controlling a gas flow in an internal combustion engine, with an armature (13) which is mounted in a stator (14) such that it can move between two end positions in a pivoting manner about a pivot axis (7) and which is connected or can be connected in a rotationally fixed manner to the actuation member (4), with at least one electromagnet (10), which is arranged on or in the stator (14), for generating electromagnetic attractive forces, with at least one first stator-side bearing face (18), against which a first contact face (20) of the armature (13) bears when the armature (13) is in the first end position, and with at least one second stator-side bearing face (19), against which a second contact face (21) of the armature (13) bears when the armature (13) is in the second end position.

Figure 1:
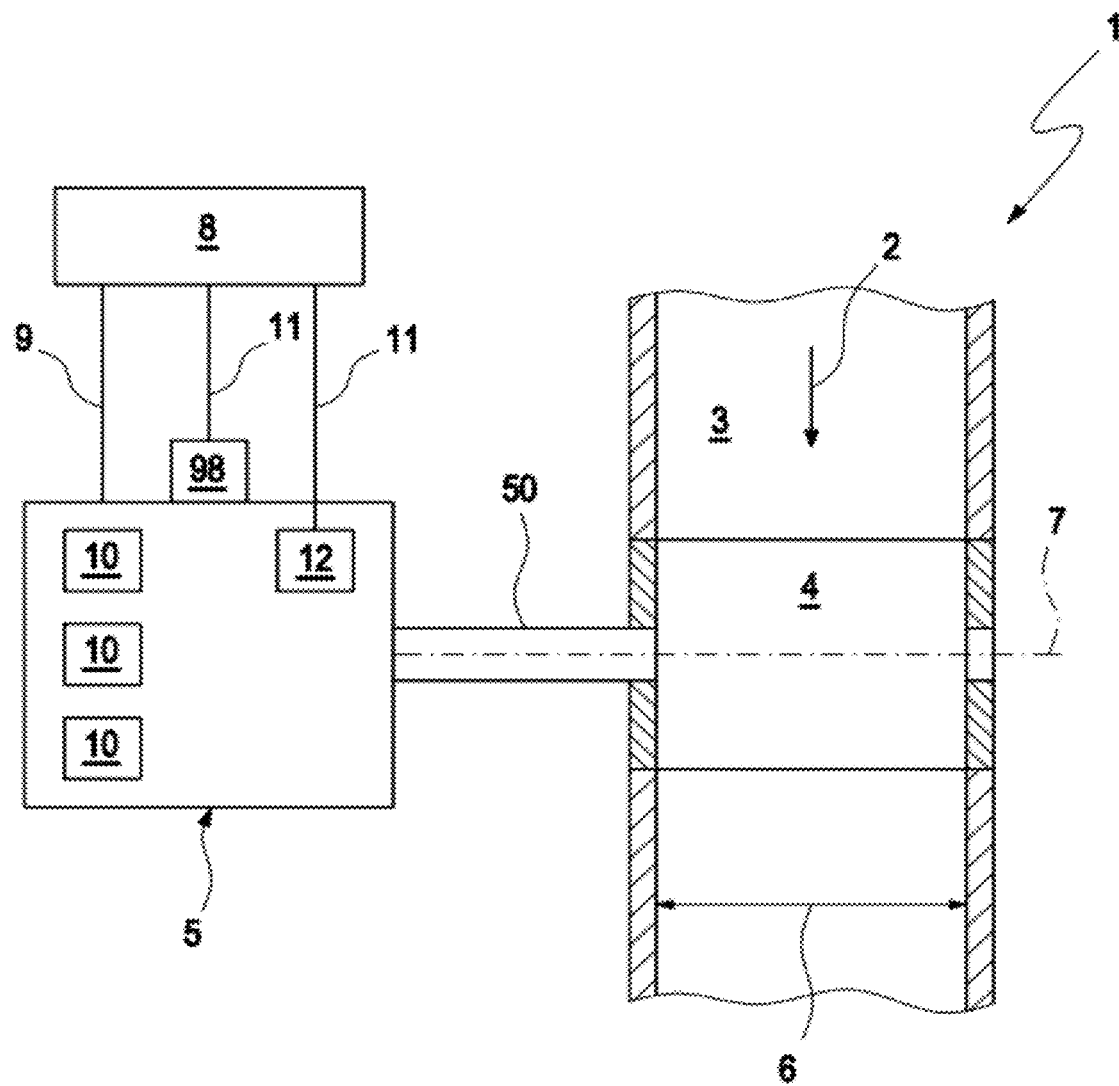

Increased reliability can be achieved for the operation of the actuation device (5) by a sensor system (12) for measuring at least one parameter of a magnetic field, which is produced by the at least one electromagnet (10) during operation of the actuation device (5), which parameter is dependent on the armature movement and/or armature position.

19 Claims, 6 Drawing Sheets

ACTUATION DEVICE, VALVE MEANS AND OPERATING METHOD

CROSS-REFERENCES TO RELATED APPLICATIONS

This application claims priority to German patent application DE 10 2008 058 525.4 filed on Nov. 21, 2008, and DE 10 2008 059 449.0 filed on Nov. 28, 2008, which are hereby incorporated by reference in their entirety.

The present invention relates to an actuation device for shifting an actuation member between two end positions, in particular for controlling a gas flow in an internal combustion engine. The invention also relates to a valve means which is equipped with such an actuation means. The invention furthermore relates to a method for operating such an actuation device.

Fast-switching valves can be used in what is known as the "pulse charging" of internal combustion engines. A fast-switching valve can to this end be arranged upstream of an inlet valve in a fresh gas line which supplies fresh gas to a single cylinder of the internal combustion engine. The exploitation of dynamic flow effects means that pressure waves can be produced in the respective fresh gas line, with the aid of which the charging of the respective cylinder can be improved. Other areas of application are also known for such fast-switching valves. For example, they can be used to control an exhaust gas recirculation rate. To this end the respective fast-switching valve can for example be arranged in an exhaust gas line of the internal combustion engine, downstream of an extraction point for exhaust gas to be recirculated. Momentary, clocked closing of the valve allows pressure pulses in the exhaust gas line to be used to facilitate recirculation of exhaust gas. Extremely short switching times are necessary for the switchover from an end position associated with a closed state to an end position associated with an open state. The switchover times of such fast-switching valves are within the range of switching times of gas exchange valves in the internal combustion engine. For example, a fast-switching valve can open and close at least once during an opening phase of an inlet valve. The switching times can be less than 10 ms and can be in particular in the range between 2 ms and 5 ms. In order to control the exhaust gas recirculation rate, such a valve can likewise be arranged in a common fresh gas line, from which the fresh gas is distributed to a plurality of cylinders of the internal combustion engine. The valve can be arranged in this common fresh gas line upstream or downstream of an introduction point for exhaust gas to be recirculated. During operation of the internal combustion engine pressure waves can arise in the fresh gas flow, which can be intensified and even produced with the aid of the fast-switching valve which is arranged on the fresh gas side. This means that the pressure at the introduction point can be influenced, which can be used to control the exhaust gas recirculation rate.

Such a fast-switching valve requires a corresponding fast-switching actuation device (actuator) for operating the valve or generally for shifting an actuation member between two end positions. Such an actuation device comprises for example an armature, which is mounted in a stator such that it can move between two end positions in a pivoting manner about a pivot axis and which is connected or can be connected in a rotationally fixed manner to the respective actuation member, in particular to the valve member. The actuation device further comprises at least one electromagnet which is arranged on or in the stator, with the aid of which electromagnetic attractive forces can be produced in a targeted manner. Furthermore, at least one first stator-side bearing face is provided, against which a first contact face of the armature bears when the armature is in the first end position. At least one second stator-side bearing face is also provided, against which a second contact face of the armature bears when the armature is in the second end position. A restoring means which preloads the armature into a rest position which is situated between the end positions can expediently also be provided, for example in the form of a torsion spring. An actuation device of this type is disclosed for example in DE 101 40 706 A1.

The respective electromagnet is used to hold the armature in the respective end positions against the respective bearing face, which forms a stop defining the end position. The armature can be drive-coupled to the respective actuation member, in particular to a valve member of a fast-switching valve, via a shaft. The end positions of the armature can therefore be assigned to the open state and the closed state of the valve member. If the respective electromagnet holds the armature in one end position, the restoring means, which is preferably a spring means, in particular a torsion spring, is loaded. When the armature is released from one end position, the restoring force of the spring means drives the armature in the direction of the rest position. The potential energy stored in the spring means is converted into kinetic energy of the armature. In other words, the armature is accelerated. When the rest position is passed through, the potential energy of the restoring means is completely converted into kinetic energy of the armature. Correspondingly, the armature continues to move in the direction of the other end position. The kinetic energy of the armature is converted back into potential energy of the restoring means, as a result of which the armature is slowed. In order to be able to catch the armature at the stop which is associated with the other end position, that is, at the other bearing face, the respective electromagnet which is associated with the catching bearing face must be supplied with current at the right time. On the one hand, the energy conversion losses, for example heat, must be compensated using the catching electromagnet. On the other hand, it must be ensured with the aid of the catching magnet that the armature remains on the catching bearing face. Furthermore, the armature should not bounce against the catching stop. Moreover, the impact speed of the armature against the catching stop should be as low as possible in order to minimise wear and noise. This makes the design of the control and regulation of the respective electromagnet extremely complex as contradictory requirements have to be realised. Furthermore, the time spans which are available for the controlling and regulating process are extremely short, which makes the said processes even more difficult. Added to this is the fact that the boundary conditions of the actuation device can change during operation, in particular in connection with an internal combustion engine. For example, the temperature of the actuation device can change. The restoring means can have a temperature-dependent characteristic, as a result of which temperature-dependent restoring forces and thus temperature-dependent armature speeds can be produced. Furthermore, the flow resistance against which the respective valve member must be moved with the aid of the armature can vary depending on the operating state of the internal combustion engine. Actuation forces which are varied by the actuation device must therefore be feasible.

In order to be able to control or regulate the electrical energy supply of the respective electromagnet, that is, the supply of current and voltage to the respective electromagnet as precisely as possible, it is especially important to know the position of the armature within its path as precisely as possible. For example, it is important to switch on the respective electromagnet to produce attractive magnetic forces only when the armature has passed its rest position when changing end positions. In order to determine the position of the armature, it is possible in principle to couple the armature to a rotation sensor for example by means of a shaft which is connected in a rotationally fixed manner to the armature. Rotation sensors which allow sufficiently accurate measurements at the short switching times required here are however comparatively expensive. Also, the strong magnetic fields of the armature can interfere with such rotation sensors. They are thus unsuitable for the present application. Furthermore, it is possible in principle to measure the voltage induced by the armature movement in a coil of the catching electromagnet, in order to determine the position of the armature from it. The armature movement changes the magnetic field of the catching electromagnet. This change in the magnetic field leads to an induced voltage at the coil of the catching electromagnet so that the armature position can be deduced from this. The induction however always takes place with a certain delay or loss so that the exact armature position can only be estimated. Also, the computing power for such position detection using the induced voltage is comparatively high so that complex, powerful and thus expensive electronics are necessary.

Furthermore, the knowledge of which of the two end positions the armature is currently occupying is of especial importance for the actuation device in order to be able to carry out the control and regulation of the catching electromagnet correctly during changing of the end positions. To do this it is possible, using a corresponding starting procedure, to bring the armature from the rest position into a predefined end position and to count each switching operation from then on using a counter so that the current end position of the armature is always known if the switching operations always function properly. On the one hand, proper switching is not always guaranteed. For example, the case can arise with unfavourable flow conditions that the armature does not reach the other end position and springs back into the original end position and is held there owing to the preloaded restoring spring. Such a malfunction is not recognised by the counter. On the other hand, such a counter also requires computing power, which constitutes a load on the electronics.

The present invention is concerned with the problem of specifying an improved embodiment for an actuation device of the type mentioned at the start and for a valve means equipped therewith and for an associated operating method, which improved embodiment is characterised in particular in that it simplifies the control and regulation of the energy supply of the respective electromagnet by providing in particular knowledge of the current armature position with increased reliability and accuracy.

This problem is solved by the subject matter of the independent claims. Advantageous embodiments form the subject matter of the dependent claims.

The invention is based on the general idea of integrating a sensor system in the actuation device, with the aid of which at least one parameter of a magnetic field can be measured during operation of the actuation device, with this magnetic field being generated by at least one electromagnet of the actuation device and with at least one such parameter, which depends on the armature movement or on the armature position, of this magnetic field being measured. In other words, the actuation device is equipped with an additional sensor system which allows direct measurement of the change in the magnetic field owing to the armature movement. The sensor system thus operates contactlessly. As the separate sensor system does not have to rely on the induced voltage of the coil of the electromagnet, outlay on computing is reduced and can lead to increased precision of position detection for the armature. Moreover, there is no interference with the applied current at the electromagnet.

A control means can use the sensor system for example to identify the actual end position of the armature which the armature is currently occupying or into which the armature is currently pivoting. This means that a counter can be omitted, as a result of which computing power of a processor of the control means is freed up.

In addition or alternatively, such a control means which is provided to operate the at least one electromagnet can evaluate the measurement signals which are determined with the aid of the sensor system in such a manner that the desired regulation of the current and/or voltage supply of the at least one electromagnet can be carried out with it. As the armature position does not have to be determined in a complex manner using the induced voltage of the coil of the electromagnet in the actuation device presented here, more computing power is available to the processor of the control means in this case too. At the same time, the inertia of the coil of the electromagnet no longer applies, so that the position of the armature can be determined with increased accuracy. The regulation of the energy supply of the (catching) electromagnet can thereby be carried out more accurately. The increased precision of the regulation can be used to reduce the electricity consumption of the actuation device and to improve the acoustics during operation, in particular to reduce annoying noises.

It can optionally be provided for the regulation of the current and/or voltage supply of the at least one electromagnet, which is dependent on the measurement signals of the sensor system, to end after a predefined regulation time in order then to supply the at least one electromagnet with a constant voltage. This means that additional options for optimising the switching processes are produced. For example, the regulation time can be adapted by monitoring the achievable impact speed, in order to optimise the switching behaviour of the actuation device with regard to minimal generation of noise.

The respective sensor system can have at least one leakage flux sensor. Such a leakage flux sensor can be realised particularly simply and in particular without essential design changes to the armature/stator configuration. Such leakage flux sensors can preferably be used to identify the respective end position of the armature but can also in principle be used to determine the armature position between the end positions and thus to regulate the current of the respective electromagnet.

In addition or alternatively, the sensor system can have at least one effective flux sensor which delivers considerably more accurate measured values, as a result of which the current armature position can be determined with increased accuracy while the armature is moving. At the same time such an effective flux sensor is suitable for identifying the current armature end position.

Further important features and advantages of the invention can be found in the subclaims, the drawings and the associated description of the figures using the drawings.

It is self-evident that the features which are mentioned above and those which are still to be explained below can be used not only in the combination specified in each case, but also in other combinations or alone without departing from the framework of the present invention.

Preferred exemplary embodiments of the invention are shown in the drawings and are explained in more detail in the following description, with the same reference symbols referring to the same or similar or functionally identical components.

Figure 2:
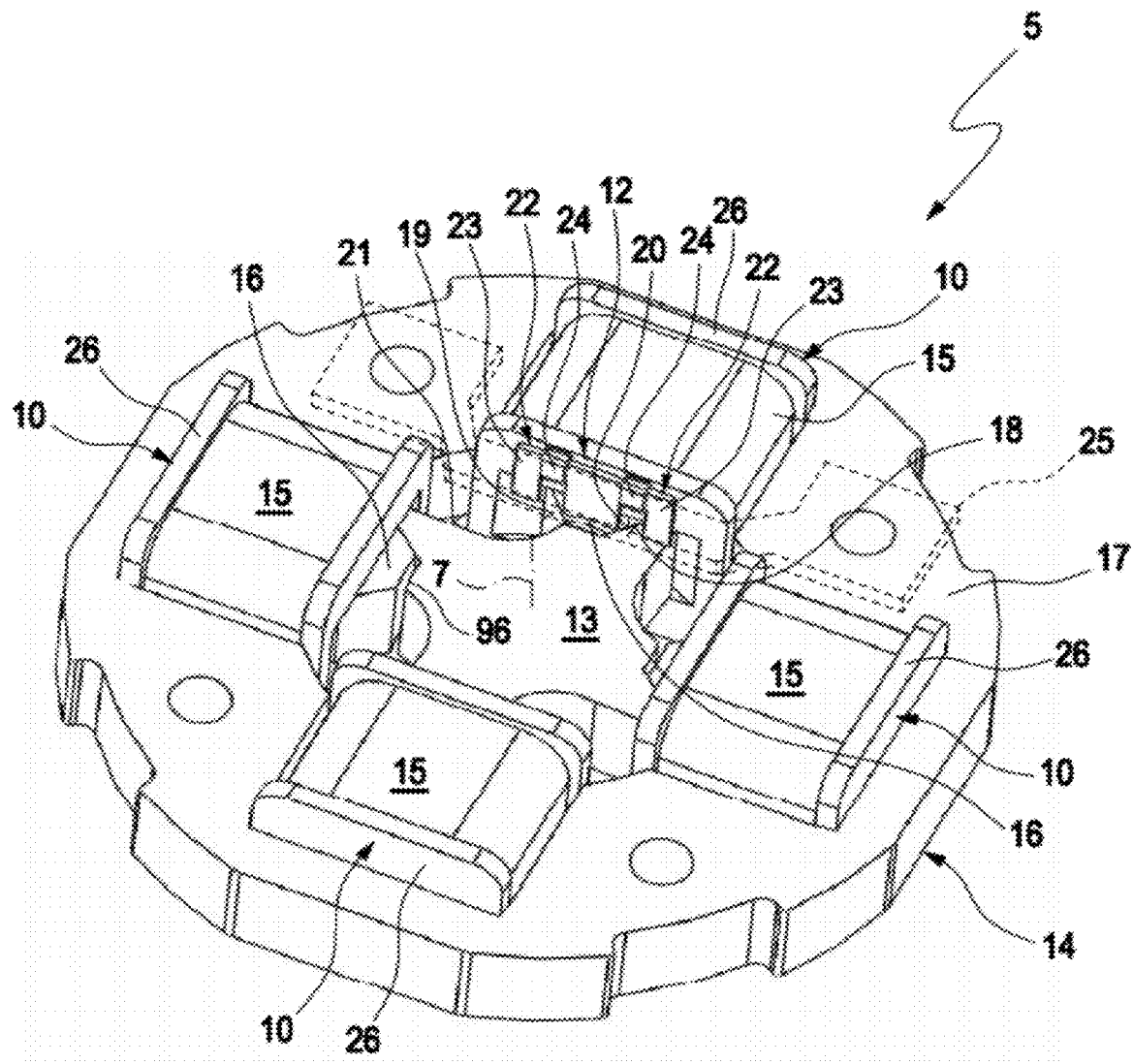
Figure 3:
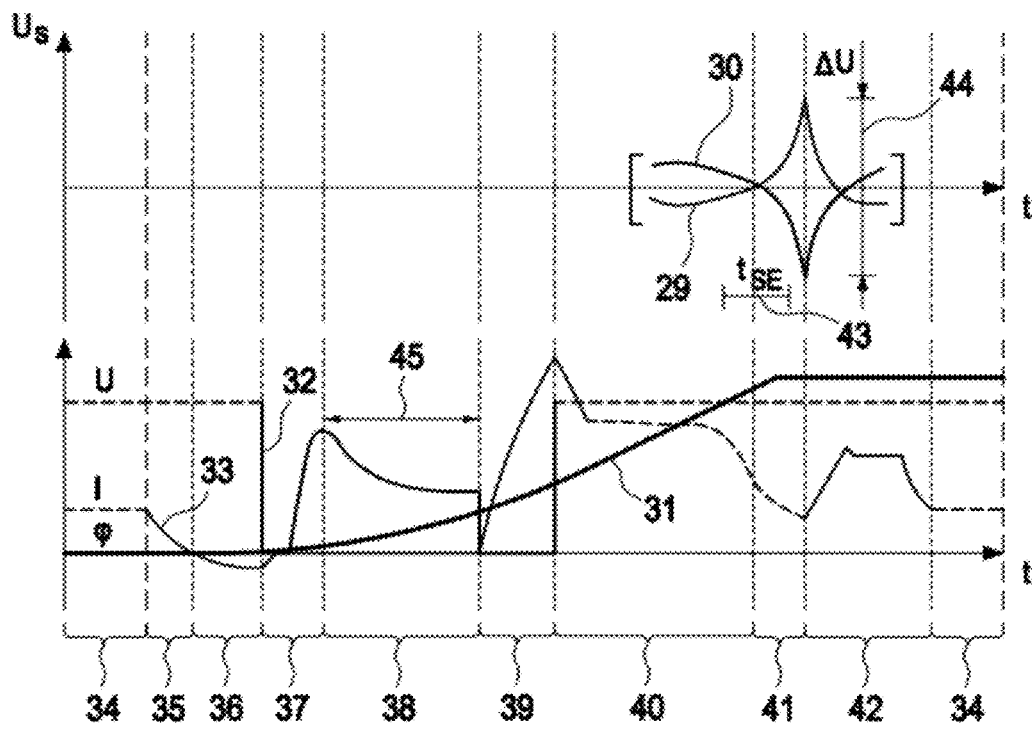
Figure 4:
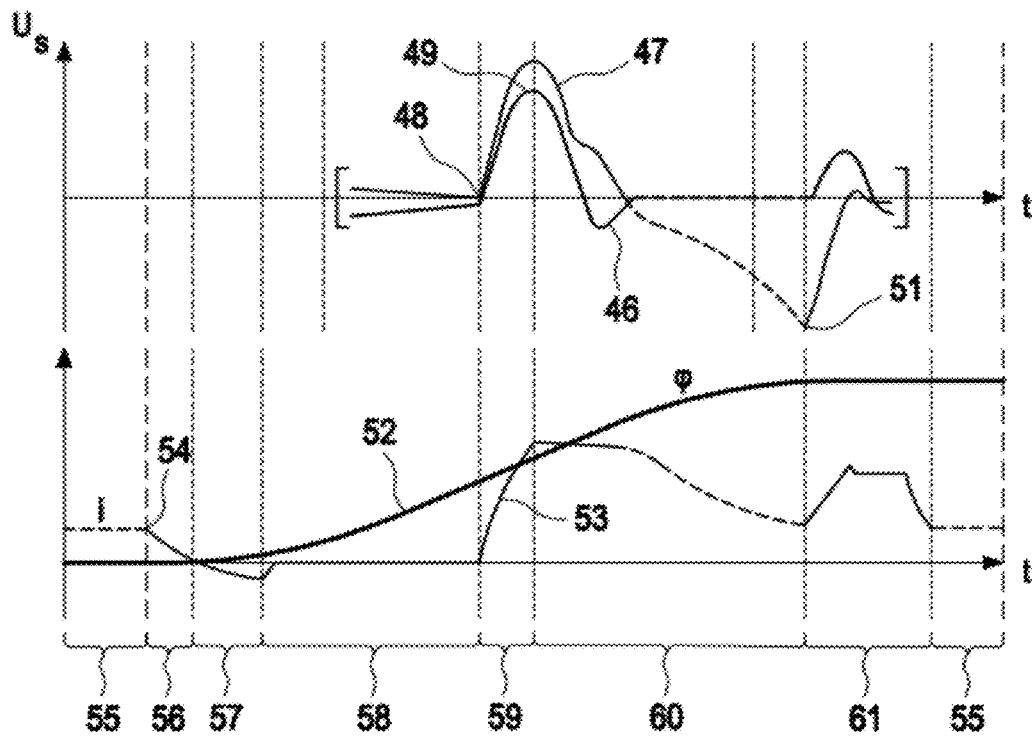
Figure 5:
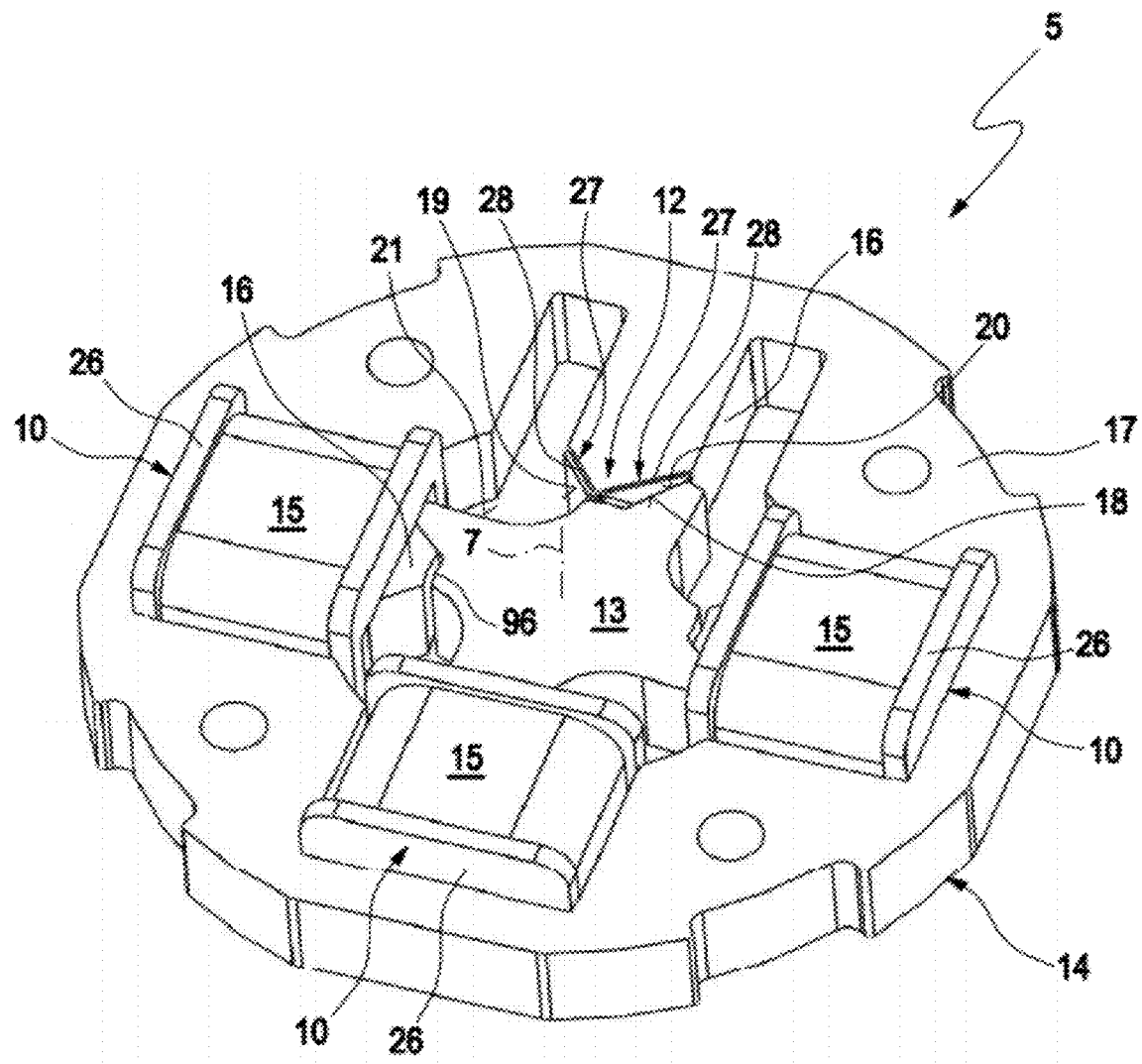
Figure 6:
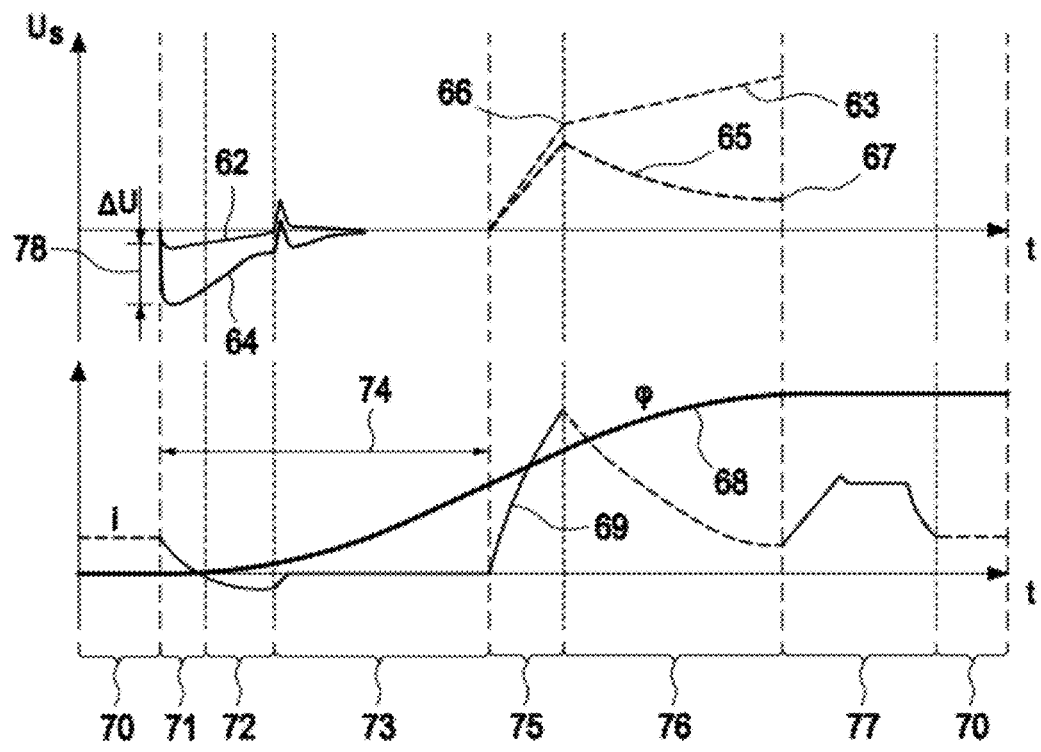
Figure 7:
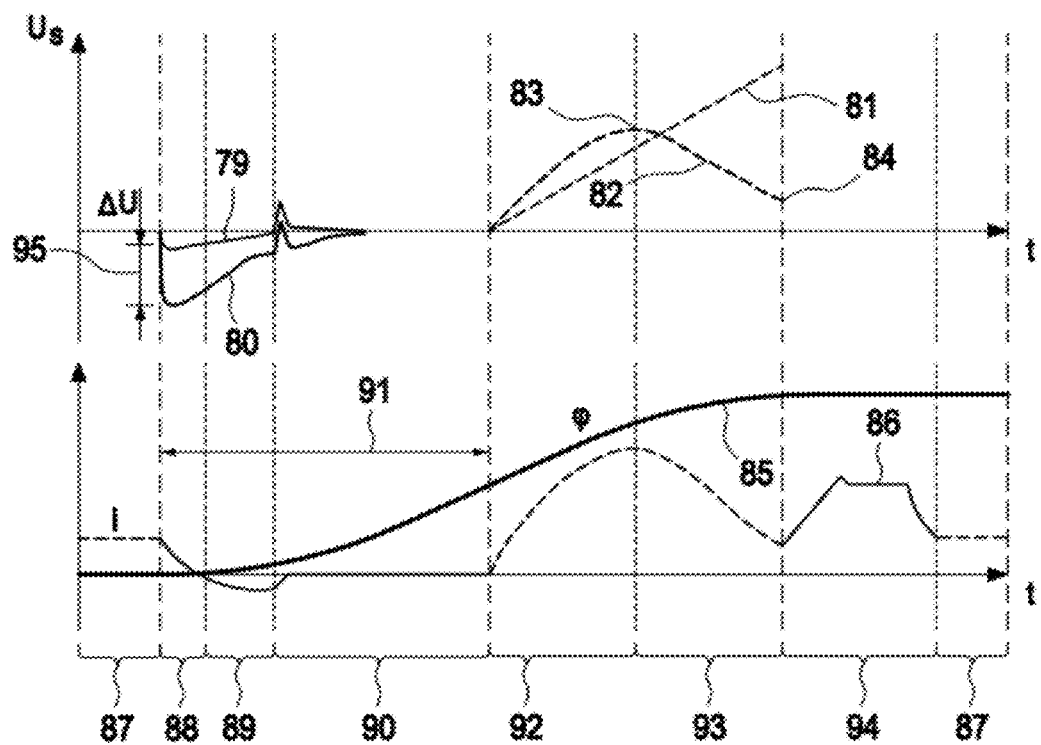
Figure 8:
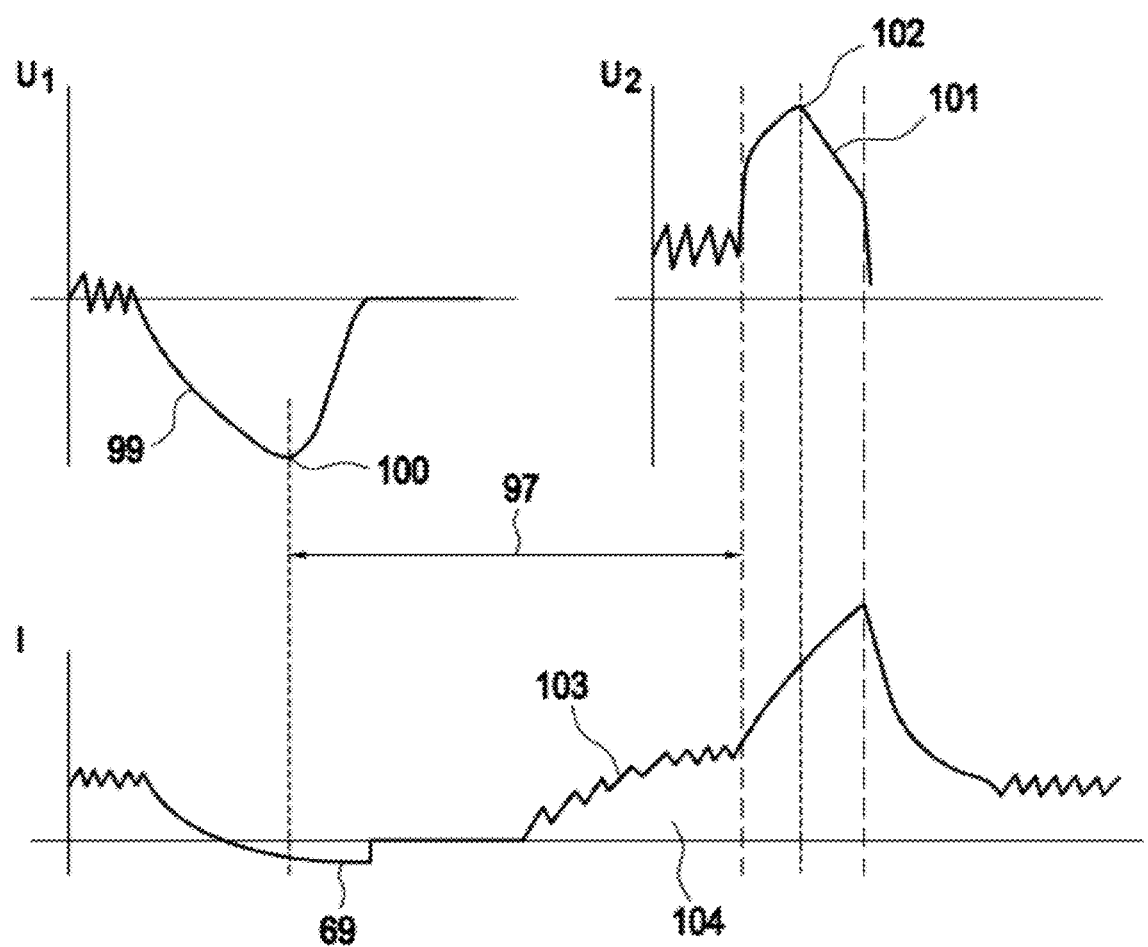

In the figures,

FIG. 1 schematically shows a very simplified, circuit-diagram-like outline of a valve means with an actuation device, FIG. 2 schematically shows a very simplified, perspective view of an actuation device, FIG. 3 schematically shows diagrams for illustrating side recognition in the actuation device of FIG. 2, FIG. 4 schematically shows diagrams for illustrating current regulation in the actuation device of FIG. 2, FIG. 5 schematically shows a perspective view of the actuation device as in FIG. 2, but in a different embodiment, FIG. 6 schematically shows diagrams for illustrating current regulation and side recognition in the actuation device of FIG. 5, FIG. 7 schematically shows diagrams as in FIG. 6, but with a different embodiment of the current regulation, FIG. 8 schematically shows diagrams as in FIG. 4, but with a further embodiment of the current regulation.

According to FIG. 1, a valve means 1, with the aid of which a gas flow 2 in a gas path 3 can be influenced, comprises a valve member 4 and an actuation device 5. The valve member 4 is used to change a cross section 6 of the gas path 3 which can be flowed through and to this end is arranged such that it can move between two end positions in a pivoting manner about a pivot axis 7. The actuation device 5 is used to shift the valve member 4 between the end positions. In order to operate the actuation device 5, a control means 8 is provided, which is connected to at least one electromagnet 10 of the actuation device 5 via at least one control line 9. Furthermore, the control means 8 is coupled to a sensor system 12 of the actuation device 5 via at least one signal line 11. The control means 8 can in particular switch on the electromagnets 10 as a function of measurement signals of the sensor system 12. In the example of FIG. 1 at least one knock sensor 98 is also provided, which can be connected to the control means 8 in a suitable manner, in particular by means of a further signal line 11.

The respective knock sensor 98 is used to detect knocking noises and to this end can be arranged in particular on the actuation device 5. As the knocking noises propagate relatively widely as structure-borne sound, the knock sensor 98 can also be arranged at another point. The knock sensor 98 can in particular be a knock sensor 98 such as can be present in any case in an internal combustion engine, in particular in a diesel engine, for monitoring combustion processes.

According to FIGS. 2 and 5, such an actuation device 5, with the aid of which an actuation member, for example the valve member 4, can be pivoted between two end positions, comprises an armature 13, which is connected in the respective application in a rotationally fixed manner to the respective actuation member 4. The armature 13 is mounted in a stator 14 of the actuation device 5 such that it can move between two end positions in a pivoting manner about the pivot axis 7. In FIGS. 2 and 5 a rest state is shown in each case, in which the armature 13 occupies a rest position or neutral position which lies between the two end positions, in particular centrally.

The actuation device 5 has—as already mentioned in connection with FIG. 1—at least one electromagnet 10, with the aid of which electromagnetic attractive forces can be generated. In the example shown, exactly four such electromagnets 10 are provided, which act in parallel and can for example be arranged distributed uniformly in the circumferential direction with respect to the pivot axis 7. The respective electromagnet 10 is arranged in the stator 14 and comprises in each case a working coil 15 which surrounds a core 16. The respective core 16 is in this case already a part of the stator 14. The stator 14 further comprises a yoke 17 which connects the individual cores 16 to each other. At the same time, the yoke 17 forms a support for the working coils 15.

Each electromagnet 10 is assigned a first stator-side bearing face 18 and a second stator-side bearing face 19. The two bearing faces 18, 19 are formed on the core 16 of the respective electromagnet 10, that is, on the stator 14 in this case. The armature 13 has a first contact face 20 and a second contact face 21 for each electromagnet 10. When the armature 13 is in the first end position, it bears with its first contact face 20 against the first bearing face 18. When the armature 13 is in the second end position, it bears with its second contact face 21 against the second bearing face 19. In the example, in accordance with the four electromagnets 10 provided here, four first bearing faces 18 and four second bearing faces 19 are provided on the stator side, which interact with four first contact faces 20 and four second contact faces 21 on the armature side. It is clear that a different number of electromagnets 10, bearing faces 18, 19 and contact faces 20, 21 can also be provided in a different design.

Furthermore, the respective actuation device 5 has a restoring means (not shown here) which is configured in such a manner that it preloads the armature 13 out of each of the two end positions into a neutral or rest position between them. For example, the restoring means is a spring means which is loaded when the armature 13 moves out of its rest position in order to store kinetic energy. It can be in particular a torsion spring which runs for example in a shaft 50 which is shown in FIG. 1, is configured as a hollow shaft and connects the armature 13 to the actuation member 4.

As already explained with reference to FIG. 1, the actuation device 5 also comprises a sensor system 12. The sensor system 12 is configured in such a manner that at least one parameter of a magnetic field which is produced by the respective electromagnet 10 can be measured with it, during operation of the actuation device 5. The sensor system 12 measures a parameter which is dependent on the movement or position of the armature 13. For example, the magnetic flux or change in magnetic flux or the speed of the change in magnetic flux is detected. The measurement signals can be used by the control means 8 to identify the actual end position of the armature 13. In addition or alternatively, the measurement signals can be used by the control means 8 to carry out regulation of the current or voltage supply of the at least one electromagnet 10. These applications are explained in more detail below with reference to FIGS. 3, 4 and 6, 7. More details are given below on preferred embodiments of the actuation device 5.

According to FIG. 2, the sensor system 12 can have at least one leakage flux sensor 22. In the preferred embodiment shown, two such leakage flux sensors 22 are shown. A single leakage flux sensor 22 can also be sufficient in principle. The respective leakage flux sensor 22 is arranged in the region of one of the bearing faces 18 or 19 on the stator 14. In the example, one leakage flux sensor 22 is arranged with one of the electromagnets 10 in the region of the first bearing face 18, whereas the other leakage flux sensor 22 is arranged in the region of the second bearing face 19. The respective leakage flux sensor 22 is positioned axially offset to the respective bearing face 18 or 19 in relation to the pivot axis 7 of the armature 13. It thus does not measure the flux, which flows through the respective bearing face 18, 19, but a leakage flux which correlates with the flow rate and extends outside of the respective bearing face 18, 19. The use of a single leakage flux sensor 22 makes it possible to identify unambiguously the end position occupied by the armature 13, what is known as side recognition. If two leakage flux sensors 22 are used, the armature movement can be detected additionally or alternatively. In this case the respective magnetic field parameter is detected which changes due to the movement of the armature 13.

The respective leakage flux sensor 22 has a yoke body 23 and a measuring coil 24. In the example, a yoke body 23 which is common to both leakage flux sensors 22 is provided, which has an essentially E-shaped configuration. In principle two separate leakage flux sensors 22 which have U-shaped yoke bodies 23 are also possible. The respective leakage flux sensor 22 is attached to a support 25. The support 25 is fixed to the stator 14. The support 25 extends in a likewise yoke-shaped manner around one electromagnet 10 and thereby allows positioning of the sensor system 12 in the leakage flux of the two bearing faces 18, 19 which are formed on the core 16 of this electromagnet 10. It is likewise possible to integrate the leakage flux sensors 22 structurally in the electromagnet 10. In particular, the leakage flux sensors 22 can be structurally integrated in the working coil 15 of this electromagnet 10 or in a coil housing 26 which also bears the working coil 15. The two leakage flux sensors 22 are expediently assigned to the same electromagnet 10. An embodiment is however also possible in which the two leakage flux sensors 22 are assigned to different electromagnets 10. An embodiment with more than two leakage flux sensors 22 is also conceivable. The structural integration of the leakage flux sensors 22 can be carried out in a comparatively simple manner in design terms, as in particular no change has to be made to the stator 14.

According to FIG. 5, the sensor system 12 can have at least one effective flux sensor 27. In the example, two such effective flux sensors 27 are provided. The respective effective flux sensor 27 is in each case assigned to one of the bearing faces 18, 19 and correspondingly arranged in the region of the respective bearing face 18, 19 on the stator 14. The respective effective flux sensor 27 is situated in the same axial section as the respective bearing face 18, 19 with respect to the pivot axis 7. The respective effective flux sensor 27 has a measuring coil 28 which surrounds the associated bearing face 18, 19. In the example, two effective flux sensors 27 are provided, the measuring coils 28 of which in each case surround one of the bearing faces 18, 19. In another embodiment it is also in principle conceivable for the effective flux sensor 27 to have a measuring coil 28 which surrounds both bearing faces 18, 19 and in particular the core 16.

Using a single measuring coil 28 which surrounds both bearing faces 18, 19 or surrounds one of the bearing faces 18, 19, the change which is produced in the magnetic flux by the respective bearing face 18, 19 owing to the armature movement can be detected. If the measuring coil 28 is only assigned to one of the bearing faces 18, 19, the end position in which the armature is situated can be identified. However, two effective flux sensors 27 are preferred, with the aid of which both the armature movement and the armature end positions can be detected.

The respective effective flux sensor 27 is in this case integrated structurally in the core 16 of the electromagnet 10, as a result of which it is at the same time structurally integrated in the stator 14 in the design of the stator 14 presented here. Furthermore, it is in principle possible to integrate the effective flux sensor 27 or its measuring coil 28 structurally in the working coil 10. An integration in the respective electromagnet 10 is likewise generally conceivable. For example, the coil support 26 can have a projection which is configured in a complementary manner to the free end of the core and receives the respective measuring coil 28. The working coil 15 and the respective effective flux sensor 27 are then positioned automatically by the assembly of the electromagnet 10 or of the coil body 26.

The different designs presented in FIGS. 2 and 5 can be realised alternatively. A cumulative realisation is likewise conceivable. In particular, the current regulation for the electromagnet 10 can be realised using the at least one effective flux sensor 27, whereas the end position detection or side recognition of the armature 13 is carried out using the at least one leakage flux sensor 22. The different sensors 22, 27 can be arranged on different electromagnets 10. A parallel arrangement on a plurality of cores 16 is likewise possible, for example to improve the measurement by averaging and/or to create a redundancy.

In the examples shown here the armature 13 is configured asymmetrically in order to be able to attract it out of the neutral rest position in a predefined direction of rotation by supplying the electromagnets 10 with current. This asymmetry is realised in this case for example by means of a field line effect 96 which is assigned in each case to the first contact face 20. A specific excitation process causes the armature 13 to move out of the rest position into the predefined end position. According to FIG. 5, the effective flux sensor 27 which is assigned to the first bearing face 18 is positioned in such a manner that it takes this asymmetry into account. A corresponding consideration can be made for the leakage flux sensors 22.

The actuation device 5 is preferably configured in preferred embodiments as a high-speed actuation device 5 which is characterised in that it needs a switching time of less than 10 ms or preferably less than 5 ms to pivot the armature 13 between the two end positions.

The side recognition of the armature position using the leakage flux sensors in conjunction with conventional current regulation for the electromagnets 10 is described in more detail below with reference to FIG. 3.

In the top diagram, two chronological profiles are plotted for the induced voltages $U_S$ which can be measured at the measurement coils 24 of the two leakage flux sensors 22, namely a profile 29 for the catching or applying side and a profile 30 for the delivering or releasing side. In the bottom diagram there are: a chronological profile 31 for the rotation position of the armature 13 (the angle of rotation φ is given), a chronological profile 32 of the voltage U applied at the coils 15 of the electromagnets 10 and a chronological profile 33 of the current i flowing through the coils 15 of the electromagnets 10.

During a phase 34 which is indicated by a curly bracket on the x-axis of the lower diagram, a holding current is choppered in order to hold the armature 13 in one of its end positions. At the beginning of a phase 35 the command to switch over the armature 13 takes place. The current i is switched off. In order to prevent the armature 13 from sticking to the releasing side, a negative current is applied to the coils 15 of the electromagnets 10 in a phase 36. During a phase 37 a pause is made until the armature 13 moves. A maximum induced voltage U is expected during this phase 37. If the armature 13 was pulled away at this point, that is, has assumed its neutral or rest position instead of its end position, this maximum cannot be detected. No current is applied during the phase 38. There is just a flight phase in which the armature 13 is driven by the restoring force of a corresponding restoring means.

During a phase 39 current is applied at an increased voltage level in order to supply the electromagnet 10 with as much energy as possible in the shortest time possible. The increased voltage is necessary to overcome the inertia of the coils 15 more quickly. During a phase 40 a catching current is choppered with a reduced voltage level. The current is monitored in the process. The supply of the catching current is interrupted if the current regulator cannot maintain the level and the rise in current falls below a certain value. This interruption criterion can be recognised in the current profile 33 in the lower diagram in that the current at the end of a straight, essentially constant range drops off relatively greatly. In a phase 41 the working coils 15 are switched to free-running operation and the armature 13 impacts. This means that the first or second contact faces 20, 21 come to bear against the first or second bearing faces 18, 19. In a phase 42 an increased current level is temporarily applied in order to prevent the armature 13 from bouncing. The phase 34 is then present again, in which the holding current is choppered so that the armature is now in the other end position.

During phases 40 and 41 the measured voltages of the two leakage flux sensors 22 are observed. It is expected within this observation time for the voltage at the applying side to increase greatly when the armature 13 is applied, whereas the reverse voltage profile is expected at the releasing side. A critical criterion for the identification of the end position which is actually present can be for example the rise in both voltage curves within a predefined time window 43. In addition or alternatively a maximum distance 44 which the two profiles 29, 30 have from each other can be used as an identification criterion. This means that the end position reached by the armature 13 can be identified unambiguously without having to run a counter as well. In FIG. 3 a fixed time duration 45 is also entered, which defines a predefined time span for the phase 38. This fixed pause time 45 can be based on empirical values and can in particular vary in an adaptive regulation process.

An option of regulating the application of current to the electromagnets 10 with the aid of the leakage flux sensors 22 is explained below using FIG. 4. FIG. 4 shows in the upper diagram a profile 46 of an induced voltage $U_s$ on the applying or catching side, while a profile 47 reproduces the induced voltage $U_s$ at the delivering or releasing side. At a position 48 the two profiles 46 and 47 come so close that the distance falls below a predefined voltage distance. At a point 49 there is a maximum at least in the profile 46 of the catching side. At 51 the profile 47 of the releasing side reaches a minimum.

In the diagram shown at the bottom in FIG. 4, a profile 52 for the armature movement (the angle of rotation φ is given) and a profile 53 for the current i for supplying the electromagnets 10 or their working coils 15 are plotted. 54 marks a position of the current profile 53 at which the current supply of the electromagnets 10 is switched off in order to start a switchover process.

During a phase 55 which is indicated by a curly bracket on the x-axis of the lower diagram, the holding current is choppered so that the armature 13 is held in one of the two end positions. At the beginning of a phase 56 the current supply to the working coils 15 is switched off at position 54. The switchover process starts. In order to prevent the armature 13 from sticking to the releasing side, a negative current is applied to the working coils 15 during a phase 57. This is followed by a phase 58 during which no current is applied to the electromagnets 10. This is again a flight phase for the armature 13. This phase 58 ends at the point 48, that is, when the distance between the two sensor voltages 46, 47 falls below a predefined value. As soon as this interruption criterion is present, the phase 58 ends and the phase 59 begins, in which a comparatively large amount of energy is supplied to the system. To this end, a comparatively large amount of current is supplied at an increased voltage level. Correspondingly, the current profile 53 has a relatively steep rise in the phase 59. This phase 59 is also monitored with the leakage flux sensors 22. As soon as the profile 46, 47 of the sensor voltages reaches its maximum, which is the case at position 49, at one of the sensors 22, generally simultaneously at both sensors 22, the phase 59 ends and a phase 60 begins. During this phase 60, a constant sensor voltage is adjusted to a reduced voltage level for the current supply of the working coils 15 for the profile 46 of the leakage flux sensor 22 of the applying side. In the example the value of the x-axis is adjusted, which can be zero. This phase 60 is interrupted when the measured voltage reaches the minimum 51 in the profile 47 of the releasing side. This minimum 51 is then present when the armature 13 reaches the other end position. In the subsequent phase 61 the increased current level is applied again, with the aid of which the armature 13 can be prevented from bouncing. The holding current is then supplied again so that the phase 55 is present again. It can be seen that the entire current supply to the electromagnets 10 can be regulated as a function of the profiles 46, 47 of the induced voltage $U_s$ at the two leakage flux sensors 22. The switching times at which the phases 58, 59 and 60 end and the phases 59, 60 and 61 begin can be read from these profiles 46, 47.

A first variant for the actuation device 5 which was explained with reference to FIG. 5 for regulation of the current supply to the electromagnets 10 with the aid of the effective flux sensors 27 is explained in more detail below using FIG. 6.

In FIG. 6, the top diagram again shows a plurality of chronological profiles. Individually there are: a profile 62 for the effective flux sensor 27 of the applying side at the start of a switchover process, a profile 63 of the voltage of the effective flux sensor 27 at the applying side in a later range of a switchover process, a profile 64 for the effective flux sensor 27 of the delivering side at the start of the switchover process and a profile 65 of the releasing side towards the end of the switchover process. Marked points are a position 66 at which a parameter which is determined with the effective flux sensor 27 of the catching side reaches a predefined threshold value. A position 67 is also marked which represents a minimum in the profile 65 of the delivering side.

In the bottom diagram in FIG. 6, a profile 68 for the armature position and a profile 69 for the current i which is supplied to the working coils 15 of the electromagnets 10 are again shown. A holding current is choppered during a phase 70 which is indicated by a curly bracket on the x-axis of the bottom diagram. The armature 13 is held in one of the end positions. The phase 71 begins with the switchover command. To this end the supply current i is switched off. During the phase 72 a negative current is applied to the working coils 15 in order to prevent the armature 13 sticking to the bearing faces 18, 19 or to rectify this. Then the current supply is completely switched off during a phase 73. The armature 13 is in its flight phase. The phases 71, 72, 73 are specified in a fixed manner with regard to their length, as is indicated in FIG. 6 by a time span 74. This time span 74 has for example been determined using experiments. It can however also be adapted during operation of the actuation device 5. After the specified time span 74 has expired the phase 73 thus ends and the phase 75 begins. At the start of phase 75 there is a strong current supply to the working coils 15 at an increased voltage level. At the same time, an integration of the sensor signals, at least on the catching side, begins with this phase 75. The integration of the voltage values means that the magnetic flux can be determined. The phase 75 ends when the point 66 is reached, that is, when a predefined flux value (threshold value) is reached. Then current can be applied to the electromagnets 10 at a reduced voltage during a phase 76 in such a manner that for example a constant flux change is adjusted on the catching side. In the example of FIG. 6 a straight section with a low gradient can be seen after point 66 in the profile 63 in the top diagram. This corresponds to a constant flux change. Alternatively to the constant flux change, a linearly decreasing or linearly increasing flux change can be set in other embodiments; a parabolic or exponential profile for the flux change is likewise conceivable. At the same time the profile of the flux, namely the induced voltage $U_s$ on the delivering side according to profile 65 is observed during this phase 76. The end of this phase 76 is present when the armature 13 impacts the bearing faces 18 and 19. This can be seen in the example in that the voltage profile 65 at the delivering effective flux sensor 27 reaches its minimum at 67. As soon as this minimum 67 is present the phase 76 ends and a phase 77 begins in which an increased current level is applied in order to prevent the armature 13 from bouncing. The phase 70 is then present again, in which the holding current is chopped. The armature 13 is now in the other end position.

At the start of the switchover operation it can be identified from which end position the armature 13 is now being released or in the direction of which end position the armature 13 is set in motion by observing the voltage profiles at the two effective flux sensors 27. To this end, the minimums of the profiles 62 and 64 are observed. The voltage minimum is less at the releasing effective flux sensor 27 than at the applying effective flux sensor 27. A voltage distance 78 can be observed, which must have a minimum value. The procedure presented here thus allows current to be applied exclusively as a function of the measurement signals determined using the effective flux sensors 27. At the same time the position of the armature 13 can be identified unambiguously with the aid of these measurement signals (side recognition).

A second alternative for regulating the current supply to the electromagnets 10 in the embodiment of the actuation device 5 shown in FIG. 5 using the effective flux sensors 27 is explained in more detail below using FIG. 7.

In FIG. 7, a plurality of chronological profiles are again shown in the top diagram, namely a profile 79 of the voltage which is measured by the catching effective flux sensor 27 at the start of the switchover process. A profile 80 shows the voltage which is measured at the delivering effective flux sensor 27 at the start of a switchover process. A profile 81 reproduces the voltage which is measured at the catching effective flux sensor 27 towards the end of the switchover operation. A profile 82 reproduces the voltage profile at the delivering effective flux sensor 27 for the end range of the switchover process. At position 83 a predefined flux value is reached at the receiving side. A minimum in the voltage profile 82 of the delivering side is present at position 84.

In the bottom diagram there is a chronological profile 85 for the path (the angle of rotation $\phi$ is given) of the armature 13 and a chronological profile 86 for the current i for supplying the electromagnets 10. A holding current is chopped in a phase 87 indicated by a curly bracket on the x-axis of the bottom diagram, in order to hold the armature 13 in one end position. At the start of a phase 88 the command is made to switch over the armature 13 from one end position to the other end position. To this end, the current supply to the working coils 15 is switched off. In the phase 89 a negative current is applied again to the working coils 15 in order to prevent the armature 13 from sticking or to release the armature 13 from the bearing faces 18 and 19 in the event of such sticking. This is followed by a free flight phase 90 during which no current is applied to the electromagnets 10. In this case, too, a fixed time span 91 is specified for the phases 88, 89 and 90, which can be determined from experiments and can in particular be adapted during operation of the actuation device 5. At the end of this specified pause time 91 the phase 90 ends and the phase 92 begins. During this phase 92 the current supply to the working coils 15 is regulated in such a manner that a constant profile 81 is set at the catching effective flux sensor 27. In order to increase the flux change, the working coils 15 are supplied with current at an increased voltage level. In order to reduce the flux change again slightly, the working coils 15 are supplied with current at a reduced voltage level. In this manner the constant profile of the flux change can be adjusted. During this phase 92, the flux is integrated until a predefined maximum value is reached. This threshold value is reached at point 83. It ends the current supply by changing between different voltage levels. With the phase 93, a current supply is started during which current is supplied at the lower voltage level to increase the flux change and during which the current supply is switched off, that is, the voltage is reduced to zero, to reduce the flux change. A regulation therefore still takes place with regard to a constant flux change. At the same time the flux profile on the delivering side is observed. The phase 93 is ended as soon as the flux on the releasing side rises again, that is, as soon as the profile 82 has reached its minimum 84. This is then the case when the armature 13 moves against the stop at the other end position. In the subsequent phase 94, a current level is again applied in the working coils 15 of the electromagnets 10 which prevents the armature 13 from bouncing. The holding current is then applied again, so that the phase 87 is present again.

The voltage levels mentioned in the diagrams of FIGS. 3, 4 and 6, 7 discussed here are for example 12 V for the lower voltage level and 45 V for the higher voltage level.

The detection or identification of the end position which is actually present also takes place at the start of the switchover process by comparing the two voltage profiles 79, 80 at the two effective flux sensors 27. The voltage at the delivering effective flux sensor 27 decreases more than at the catching effective flux sensor 27. A distance 95 between the minimums of the two profiles 79, 80 is observed, which must have a minimum value.

In accordance with FIG. 8, a further possible operating method for a preferred embodiment for the actuation device 5 is explained in more detail. In this embodiment the regulation of the voltage or current at the respective electromagnet 10 is not carried out over the entire duration of the respective switching process as a function of the measurement signals which are measured using the sensor system 12. The regulation of the voltage and/or current supply of the respective electromagnet 10 takes place only during a predefined regulation time 97. This regulation time 97 begins at a time at which the armature 13 lifts off from the releasing end position, that is, at which its rotary movement begins. This time is determined using the sensor system 12. A marked time, to which the starting time of the following current supply relates, can be detected during release of the armature 13 or at the start of the rotary movement until the end of the current-free flight phase by observing a profile 99 of the sensor voltage at the releasing side and/or of the current profile 69 at the at least one electromagnet. The distinct minimum 100 in the profile 99 of the sensor voltage can preferably be evaluated at the releasing side which defines the time at which the armature 13 is released. During the regulation time 97, the voltage/current regulation of the at least one electromagnet 10 takes place as a function of the measurement signals determined using the sensor system 12. This regulation takes place in particular in a range 103 of the current profile 69 in which energy is introduced into the at least one electromagnet 10 after the free flight phase. To this extent reference can be made in particular to the above embodiments. When the regulation time 97 expires this regulation of the voltage and/or current supply of the at least one electromagnet 10 ends and a constant voltage is applied to the respective electromagnet 10. The regulation time 97 is such that the armature 13 has not yet reached the other, that is, the catching end position at the end of the regulation time 97, but has already come relatively close to it. The constant voltage which is applied to the respective electromagnet 10 is selected to be such that it is sufficient for reliably catching the armature 13. The time can for example be determined at which the armature 13 reaches the catching end position by observing a voltage profile 101 of the sensor system 12 on the catching side. When the armature 13 makes contact in the catching end position the voltage profile 101 of the catching side is at a maximum 102.

In order to be able to produce as little noise as possible during the switching processes, the lowest possible impact speed is desired for the armature 13 when it bears against the respective bearing face 18, 19. There is a plurality of possibilities for determining the impact speed of the armature 13. Firstly, the control means 8 can evaluate measurement signals of the knock sensor 98. The intensity of the knock signals determined therewith correlates with the impact speed of the armature 13. Alternatively, the measurement signals of the sensor system 12 on the catching side can also be evaluated. In the profile 101 of the sensor voltage of the catching side, the rise in voltage at the end of the regulation time 97 until the maximum 102 correlates with the impact speed of the armature 13. The steeper the rise in voltage, the higher the impact speed.

The control means 8 can then adapt an energy input into the at least one electromagnet 10 during the regulation time 97 as a function of the impact speed of the armature 13. This energy input corresponds to an area 104 below the current profile 69 in the range 103 and is also referred to below as energy input 104. This means that the impact speed of the armature 13 which has been determined for the current switching operation is used to adapt the energy input 104 during the regulation time 97 for the next switching operation. If the determined impact speed is below a tolerance range of permissible impact speeds, the energy input 104 is increased during the regulation time 97 by a predefined value, which can depend in particular on the distance of the determined impact speed from the tolerance range, but decreased by a predefined value, which can depend in particular on the distance of the determined impact speed from the tolerance range, if the determined impact speed is above the tolerance range. The increase or decrease of the energy input 104 can be adjusted in a simple embodiment by extending or shortening the regulation time 97. The adaptation of the energy input 104 is realised by corresponding adaptation of the regulation time 97. Alternatively, the frequency when choppering the voltage during voltage or current regulation of the at least one electromagnet 10 and/or the gradient of the rise in current and/or the level of the voltage during the voltage or current regulation can be varied in order to vary the energy input 104.

The invention claimed is:

1. A gas flow controlling actuation device comprising:
    an actuator for shifting an actuation member between a first end position and a second end position;
    an armature, wherein the armature is mounted in a stator wherein the armature can pivot between the two end positions about a pivot axis, wherein the armature is at least one of connected to the actuation member and is connected in a rotationally fixed manner to the actuation member; at least one electromagnet is arranged wherein the electromagnet is at least one of on the stator and in the stator for generating electromagnetic attractive forces; at least one first stator-side bearing face, wherein an armature first contact face bears against the first stator-side bearing face when the armature is in the first end position; and
    at least one second stator-side bearing face, wherein an armature second contact face bears against the second stator-side bearing face when the armature is in the second end position, a sensor system, for measuring at least one parameter of a magnetic field produced by the at least one electromagnet during operation of the actuation device, wherein the parameter is dependent on at least on of the armature pivot movement and armature position.

2. The actuation device according to claim 1, wherein a control means is provided for operating the at least one electromagnet, wherein the control means is coupled to the sensor system for evaluating at least one measurement signal and wherein the control means is configured such that it uses the measurement signals of the sensor system to identify an actual end position of the armature, wherein the armature is at least one of currently occupying, currently pivoting in and currently pivoting out.

3. The actuation device according to claim 1, wherein a control means for operating the at least one electromagnet is provided, wherein the control means is coupled to the sensor system for evaluating at least one measurement signal and is configured such that it uses the measurement signals of the sensor system to regulate at least one of a current and a voltage supply of the at least one electromagnet.

4. The actuation device according to claim 3, wherein the control means is configured in such a manner that during a switching operation the control means ends a regulation of at least one of the current and the voltage supply of the at least one electromagnet, wherein regulation is carried out using the measurement signals of the sensor system, after at least one of a predefined regulation time and application of a constant voltage to the at least one electromagnet.

5. The actuation device according to claim 4, wherein the control means determines a variable, which is correlated with an impact speed of the armature using the measurement signals of the sensor system during a phase of constant voltage at the at least one electromagnet and adapts an energy input for the next switching operation as a function of the variable.

6. The actuation device according to claim 4, wherein the control means is coupled to a knock sensor and adapts an energy input for the next switching operation as a function of measurement signals of the knock sensor.

7. The actuation device according to claim 1, wherein the sensor system has at least one leakage flux sensor arranged on the stator in a region of at least one of the bearing faces.

8. The actuation device according to claim 7, wherein the leakage flux sensor is arranged axially offset to the respective armature face with respect to the pivot axis of the armature.

9. The actuation device according to claim 7-wherein the sensor system has at least one leakage flux sensor having at least one measurement coil, wherein the measurement coil is assigned to at least one of the bearing faces.

10. The actuation device according to claim 7, wherein the stator includes a plurality of different electromagnets, and a plurality of leakage flux sensors, wherein the leakage flux sensors are assigned to the different electromagnets.

11. The actuation device according to claim 7, wherein the respective leakage flux sensor has a yoke body which bears the respective measurement coil, wherein the yoke body is configured in at least one of a U-shape in the case of a single measurement coil and an E-shape, in the case of two leakage flux sensors.

12. The actuation device according to claim 7, wherein the leakage flux sensor is at least on of fixed to a support fixed to the stator, and is structurally integrated into the electromagnet into a working coil of the electromagnet.

13. The actuation device according to claim 1, wherein the sensor system has at least one effective flux sensor arranged on the stator in a region of at least one of the bearing faces.

14. The actuation device according to claim 13, wherein the effective flux sensor and the bearing face are arranged in a same axial section with respect to the pivot axis of the armature.

15. The actuation device according to claim 13, wherein the effective flux sensor has at least one of a measurement coil, which surrounds one of the bearing faces, the effective flux sensor has a measurement coil which surrounds both bearing faces, and two effective flux sensors, wherein the measuring coils-surround at least one of the bearing faces.

16. The actuation device according to claim 13, wherein the effective flux sensor is at least on of structurally integrated in the stator, in the electromagnets, in the core of the electromagnet and in a working coil of the electromagnet.

17. The actuation device according to claim 13, wherein the stator includes a plurality of different electromagnets, and a plurality of effective flux sensors, which are assigned to the different electromagnets.

18. The actuation device according to claim 1, further comprising a plurality of electromagnets, a plurality of first bearing faces, a plurality of second bearing faces, a plurality of first contact faces and a plurality of second contact faces, wherein at least an equal number of electromagnets, first and second bearing faces and first and second contact faces are provided.

19. The actuation device according to claim 1, wherein the actuator is configured as a high-speed actuation device requiring less than about 5 ms to 10 ms to pivot the armature from one end position into the other end position.

* * * * *